(12) United States Patent
Aravot

(10) Patent No.: US 10,216,585 B2
(45) Date of Patent: Feb. 26, 2019

(54) ENABLING DISK IMAGE OPERATIONS IN CONJUNCTION WITH SNAPSHOT LOCKING

(71) Applicant: Red Hat Israel, Ltd., Ra'anana (IL)

(72) Inventor: Liron Aravot, Ramat-Gan (IL)

(73) Assignee: Red Hat Israel, Ltd., Raanana (IL)

( * ) Notice: Subject to any disclaimer, the term of this patent is extended or adjusted under 35 U.S.C. 154(b) by 394 days.

(21) Appl. No.: 14/193,796

(22) Filed: Feb. 28, 2014

(65) Prior Publication Data
US 2015/0248333 A1 Sep. 3, 2015

(51) Int. Cl.
*G06F 11/14* (2006.01)

(52) U.S. Cl.
CPC ...... *G06F 11/1466* (2013.01); *G06F 11/1456* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 8,898,668 B1 * | 11/2014 | Costea | G06F 9/45558 709/203 |
| 9,529,808 B1 * | 12/2016 | Sudarsanam | G06F 17/30088 |
| 2006/0036655 A1 * | 2/2006 | Lastovica, Jr. | G06F 17/30315 |
| 2008/0201455 A1 * | 8/2008 | Husain | G06F 9/445 709/220 |
| 2008/0244525 A1 * | 10/2008 | Khalil | G06F 11/3688 717/124 |
| 2010/0011178 A1 * | 1/2010 | Feathergill | G06F 11/1466 711/162 |
| 2010/0293144 A1 * | 11/2010 | Bonnet | G06F 8/63 707/640 |
| 2012/0323853 A1 * | 12/2012 | Fries | G06F 11/301 707/649 |
| 2014/0053022 A1 * | 2/2014 | Forgette | G06F 11/203 714/21 |
| 2015/0039846 A1 * | 2/2015 | Simon | G06F 9/455 711/162 |

* cited by examiner

*Primary Examiner* — Charles Rones
*Assistant Examiner* — Ryan Dare
(74) *Attorney, Agent, or Firm* — Lowenstein Sandler LLP

(57) ABSTRACT

Systems and methods for enabling disk image operations in conjunction with snapshot locking. An example method may include: attaching a first snapshot to a first virtual machine the first snapshot being stored within a disk image, generating, in view of the first snapshot, a second snapshot, the second snapshot being stored within the disk image, attaching the first snapshot to a second virtual machine, and causing the first snapshot to be locked in view of the second virtual machine performing one or more operations on the first snapshot, wherein the first virtual machine performs one or more operations on the second snapshot concurrent with the locking of the first snapshot.

18 Claims, 3 Drawing Sheets

ENABLING DISK IMAGE OPERATIONS IN CONJUNCTION WITH SNAPSHOT LOCKING

TECHNICAL FIELD

Implementations of the present disclosure relate to a computing system, and more specifically, to enabling disk image operations in conjunction with snapshot locking.

BACKGROUND

Virtualization entails running programs, usually multiple operating systems, concurrently and in isolation from other programs on a single system. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. A hypervisor may save a state of a virtual machine at a reference point in time, which is often referred to as a snapshot. The snapshot can be used to restore or rollback the virtual machine to the state that was saved at the reference point in time.

DESCRIPTION OF DRAWINGS

The details of one or more implementations are set forth in the accompanying drawings and the description below. Other features and advantages will be apparent from the description and drawings, and from the claims.

DETAILED DESCRIPTION

Figure 1:
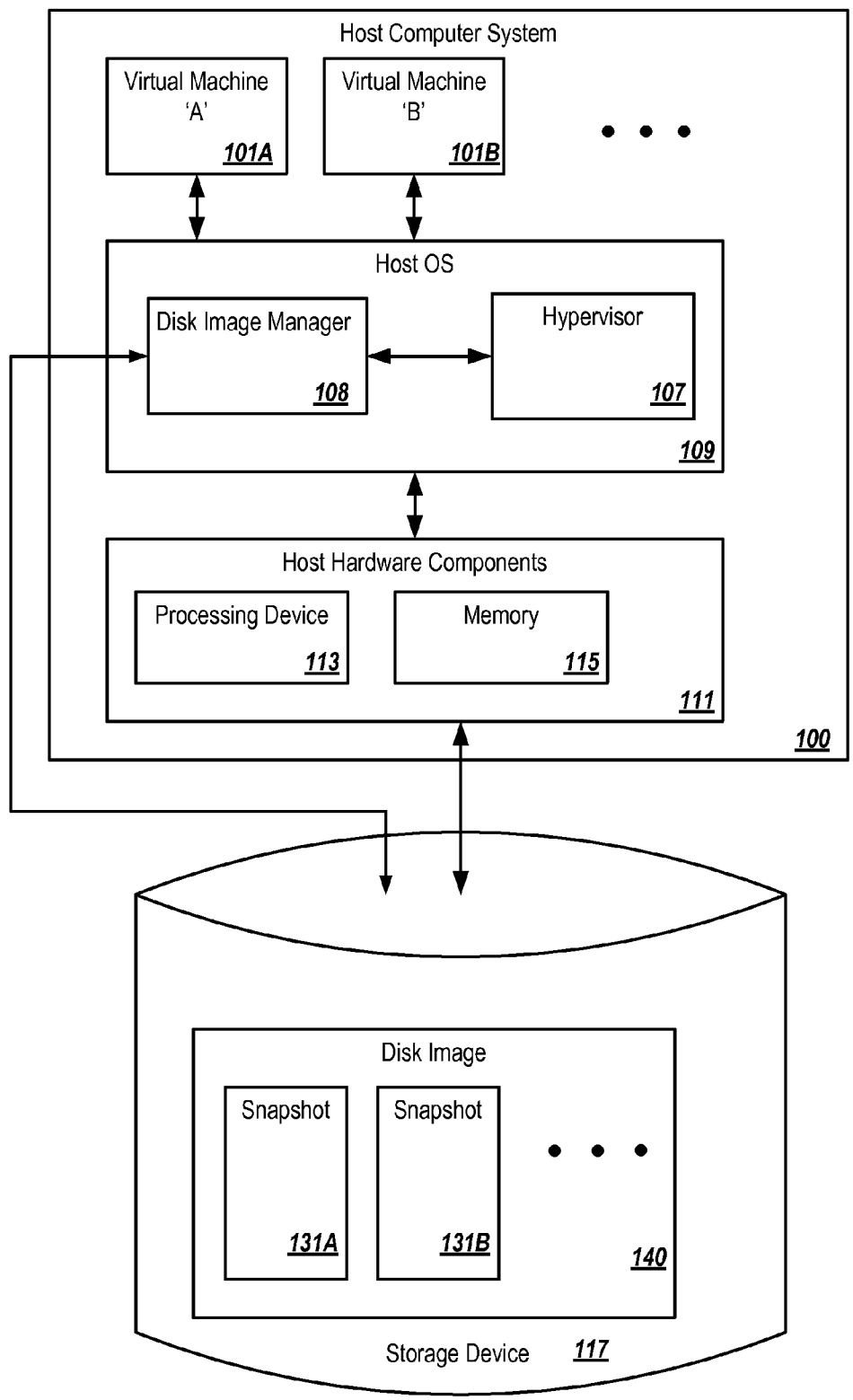
FIG. 1 is a block diagram of a host computer system in accordance with some implementations.

The present disclosure pertains to enabling disk image operations in conjunction with snapshot locking.

It can be appreciated that, in order to perform various operations on a disk image, the disk image may need to be locked in order to properly perform the desired operation(s). While locking the disk in such a way can ensure the integrity of the operation(s) (as it ensures that data, disk structure, etc., do not change while the operation(s) is/are being performed), such an arrangement also entails various inefficiencies. For example, users wishing to utilize a virtual machine (VM) in relation to such a disk image and/or data contained on the disk image may need to wait until the image is no longer locked (e.g., when the operation(s) complete(s)) in order to do so.

Accordingly, described herein are various technologies that enable the utilization of various disk image snapshots in a manner that enables the performance of operations on one snapshot included in the disk image concurrent with other operations being performed on other snapshots included in the same disk image (e.g., rather than locking the entire disk image and thereby precluding such concurrent operations). For example, in certain implementations a snapshot initially attached to one VM can be subsequently attached to another VM (e.g., a second VM). The second VM can then lock the snapshot and perform a backup operation on it, while the other VM (which remains attached to the disk image) can continue performing operations on the disk image itself (e.g., on another snapshot within the disk image). In doing so, operations requiring the locking of a snapshot included within a disk image can be performed concurrently with other operations on the disk image (e.g., on other snapshots included in the same disk image), thus eliminating interruptions, etc., that would otherwise arise.

Additionally, while certain efficiencies (e.g., time and/or processing efficiencies) can be realized by performing various operations (e.g., backup operations) on a disk image using a snapshot attached to another VM, in some scenarios such approaches/techniques cannot be optimal. For example, it can be appreciated that, for example, with respect to relatively small snapshots, it may be relatively less efficient to perform such additional operations (e.g., creating a snapshot, attaching it to another VM, etc.) rather than performing the operation(s) on the disk image itself. Accordingly, such an efficiency determination can be made, e.g., at the outset, and the various additional operations (e.g., creating a snapshot, attaching it to another VM, etc.) can be made in scenarios in which it is determined that doing so is more efficient than the alternative (e.g., performing the operation(s) on the disk image itself).

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

For brevity, simplicity and by way of example, a hypervisor performs many of the operations described herein. It is contemplated that other actors may perform some or all of the operations described herein, including a host operating system, multiple hypervisors, a disk image manager, and the like, including a combination thereof.

FIG. 1 is a block diagram that illustrates an example of a host computer system 100 that hosts one or more VMs 101A-B. Each VM can run a guest operating system (OS). The VMs may have the same or different guest operating systems, such as Microsoft Windows™, Linux™, Solaris™, Mac™ OS, etc. The host computer system 100 may be a server, a workstation, a personal computer (PC), a mobile phone, a palm-sized computing device, a personal digital assistant (PDA), etc.

The host computer system 100 runs a hypervisor 107 to virtualize access to the underlying host hardware, making the use of the VM transparent to the guest OS and a user of the host computer system 100. The hypervisor 107 may also be known as a virtual machine monitor (VMM) or a kernel-based hypervisor. The hypervisor 107 may be part of a host OS 109 (as shown in FIG. 1), run on top of the host OS 109, or run directly on the host hardware without an operating system beneath it (i.e., bare metal). The host OS 109 can be the same OS as the guest OS, or can be a different OS. In certain implementations, the hypervisor 107 can include a disk image manager 108 that handles data operations with respect to disk image(s) 140 and/or other operations. In other implementations, disk image manager 108 can execute/operate outside/independent of hypervisor 107 (e.g., as shown in FIG. 1), and may be configured to communicate with hypervisor 107, e.g., in order to provide information pertaining to certain operations (such as those described herein) to the hypervisor. Additionally, in certain implementations disk image manager 108 can execute/operate at a device/system other than host 100. Some implementations of disk image manager 108 will be discussed in more detail below in conjunction with FIG. 2.

The host computer system 100 includes hardware components 111 such as one or more physical processing devices (e.g., central processing units (CPUs)) 113, memory 115 (also referred to as "host memory" or "physical memory") and other hardware components. In one implementation, the host computer system 100 includes one or more physical devices (not shown), which can be audio/video devices (e.g., video cards, sounds cards), network interface devices, printers, graphics modules, graphics devices, system components (e.g., PCI devices, bridges, ports, buses), etc. It is understood that the host computer system 100 may include any number of devices.

The host computer system 100 may also be coupled to one or more storage devices 117 via a direct connection or a network. The storage device 117 may be an internal storage device or an external storage device. Examples of storage devices include hard disk drives, optical drives, tape drives, solid state drives, and so forth. Storage devices may be accessible over a local area network (LAN), a wide area network (WAN) and/or a public network such as the internet. Examples of network storage devices include network attached storage (NAS), storage area networks (SAN), cloud storage (e.g., storage as a service (SaaS)), and so forth.

The storage device 117 may store one or more files, such as disk image 140 which can include one or more snapshots such as snapshots 131A and 131B. Such a disk image can represent data on a hard disk and can be in any format, such as a portable binary image (e.g., raw), copy-on-write (e.g., cow), compressed loop (e.g., cloop), Quick EMUlator (QEMU) copy-on-write format (e.g., qcow, qcow2), and others, such as vmdk, vdi, etc. In certain implementations, the disk image may be a single file, set of files or sequence of data (e.g., a contiguous or non-contiguous set of blocks in a block device) that contains the contents and structure representing a storage device such as a hard drive. Snapshots 131A and 131B can reflect or include a copy of a virtual disk which is utilized in conjunction with a virtual machine, such as in a particular point in time. It should be understood that when the host computer system 100 is attached to multiple storage devices 117, some data may be stored on one storage device, while other data may be stored on another storage device.

Figure 2:
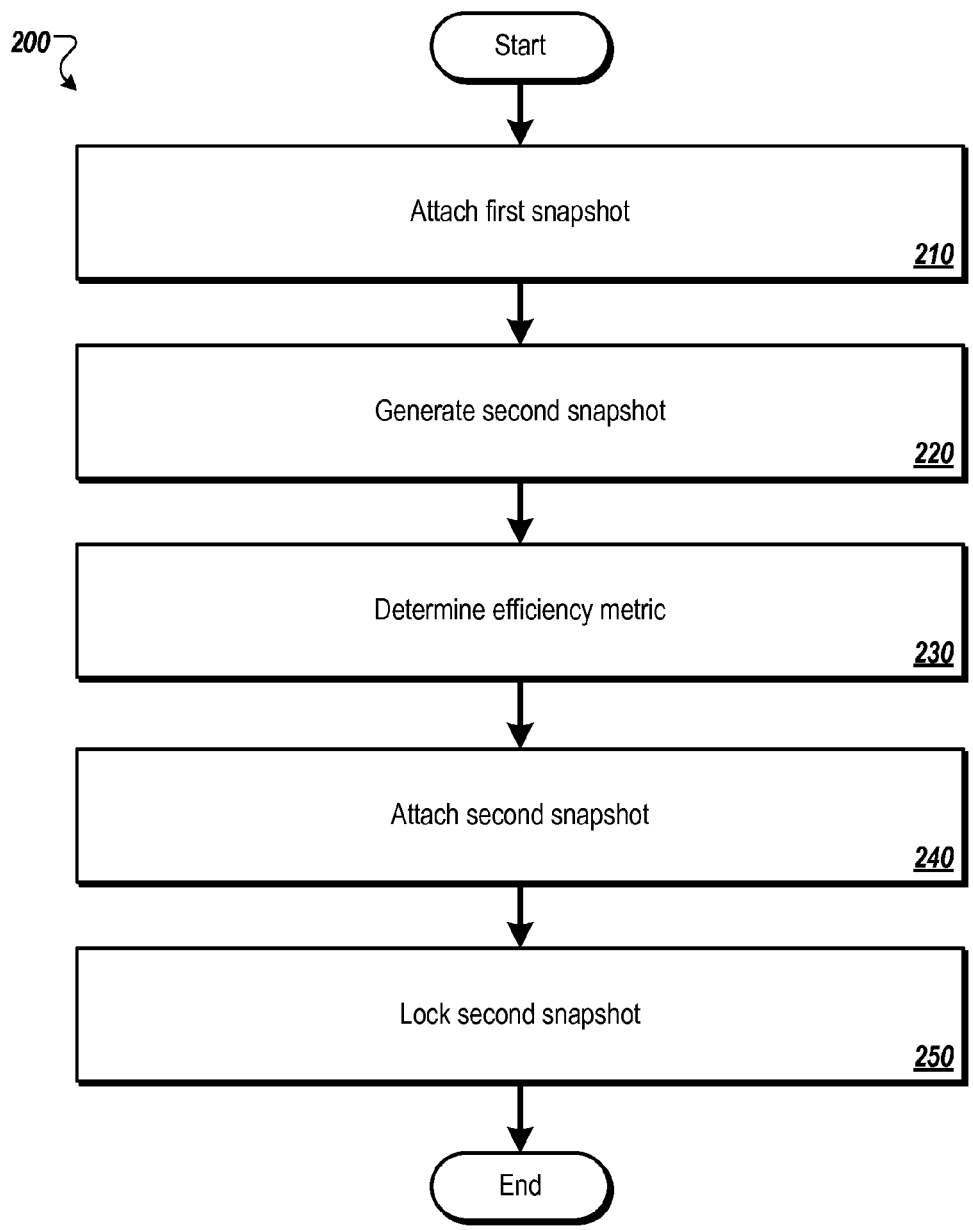
FIG. 2 is a flow diagram of a method for enabling disk image operations in conjunction with snapshot locking in accordance with some implementations.

FIG. 2 is a flow diagram of a method 200 for to enabling disk image operations in conjunction with snapshot locking in accordance with some implementations. Method 200 can be performed by processing logic (e.g., in computing system 300 of FIG. 3) that may comprise hardware (e.g., circuitry, dedicated logic, programmable logic, microcode, etc.), software (such as instructions run on a processing device), firmware, or a combination thereof. In one implementation, method 200 is performed by hypervisor 107 and/or disk image manager 108 of FIG. 1. For clarity of presentation, the description that follows uses the system 100 as examples for describing the method 200. However, another system, or combination of systems, may be used to perform the method 200.

At block 210, a first snapshot can be attached. In certain implementations, such a snapshot can be attached to a virtual machine. For example, disk image manager 108 and/or hypervisor 107 can receive a request to create a new virtual machine from a system administrator, a host controller managing VMs on various hosts, etc. Such a request can indicate that the new virtual machine should be created (e.g., virtual machine 'A' 101A, as depicted in FIG. 1) and should be attached and/or otherwise associated with a particular snapshot (e.g., a snapshot of a virtual disk) (e.g., snapshot 131A as depicted in FIG. 1). In certain implementations the first snapshot can be associated only with the new VM or with the new VM and one or more other VMs that were previously associated with the first snapshot.

At block 220, a second snapshot can be generated (e.g., based on/in view of the first snapshot attached at block 210). It should be understood that such a snapshot (e.g., a snapshot of the virtual disk associated with the virtual machine at another point in time) can be generated (e.g., by disk image manager 108 and/or hypervisor 107) in response to a particular command (e.g., a user/administrator command to generate such a snapshot) and/or on a periodic/ongoing basis (e.g., every hour, day, etc.). It should also be understood that, in certain implementations, the second snapshot can be generated while other snapshots included in the disk image (e.g., the snapshot attached at block 210) are being used by/in relation to other operations, VMs, etc. The second snapshot can be associated with/related to the same virtual machine(s) as the first snapshot (e.g., in that it can be a copy of the state of the virtual disk of the new virtual machine at a later point in time, e.g., after the first snapshot is created) and can be stored within the same disk image as the first snapshot (e.g., as a 'chain' of linked snapshots).

At block 230, an efficiency metric can be determined. In certain implementations, such an efficiency metric can be determined with respect to another virtual machine, such as another virtual machine performing one or more operations on the second snapshot (e.g., the snapshot generated at block 220). That is, it can be appreciated that while in certain scenarios it can be relatively more efficient for a process such as a backup process to be performed by another virtual machine in relation to a snapshot associated with the first virtual machine, in other scenarios the efficiency afforded by such an approach may be marginal or even less efficient than performing the backup process in relation to the disk image itself (e.g., the disk image within which the snapshot is stored). By way of illustration, scenarios involving a relatively large disk image are likely to benefit from the various techniques describe herein, as performing operations such as a backup process on such a disk image is likely to take a relatively large amount of time and is likely to result in the locking of the entire disk image for a considerable amount of time. However, scenarios involving a relatively small disk image may be less likely to benefit from attaching a snapshot to a second virtual machine (e.g., to perform a backup of the snapshot), as performing operations such as a backup process on the entire disk image is likely to take a relatively small amount of time and the actual amount of time that the disk image is likely to be locked may be relatively comparable to (if not less than) the amount of time that performing the other operations described herein (e.g., generating a snapshot, attaching the snapshot to another VM, etc.) may ultimately entail (it should be understood that various other factors, e.g., processing power, resource availability, etc., may also be factors in determining the referenced efficiency metric, in addition to and/or instead of the size of the disk image). Accordingly, having generated a second snapshot (such as at block 220), an efficiency metric pertaining to attaching such a snapshot to another virtual machine can be determined (e.g., by disk image manager 108 and/or hypervisor 107). In certain implementations, such an efficiency metric can be determined (e.g., by disk image manager 108 and/or hypervisor 107) by simulating various aspects of certain operations such as a backup process and/or by analyzing one or more aspects of the snapshot as they pertain to such a process (e.g., the size of the snapshot, etc., as such factors may entail additional delays when backing up the snapshot). Moreover, in certain implementations such an efficiency metric can reflect an amount of time (e.g., in milliseconds, seconds, etc.) and/or processing power (and/or any other resource overhead) that performing such operation(s) is likely to entail.

At block 240, a snapshot (e.g., the snapshot generated at block 220) can be attached. In certain implementations, such a snapshot can be attached to another virtual machine (e.g., a virtual machine other than the virtual machine to which the disk image was attached at block 210). For example, as depicted in FIG. 1, snapshot 131B can be attached to VM 101B (e.g., by disk image manager 108 and/or hypervisor 107). Moreover, in certain implementations the snapshot can be attached to the referenced virtual machine in response to a determination that an efficiency metric (e.g., the efficiency metric determined at block 230) exceeds a threshold, reflecting that one virtual machine performing various operations on a snapshot is relatively more efficient than locking the entire disk image and performing the one or more operations on the disk image. In doing so, the techniques describe herein can be implemented specifically in scenarios in which such techniques are likely to result in improved efficiency, e.g., in contrast to locking the disk image itself and performing operations such as a backup process on it.

Moreover, in certain implementations the snapshot can be attached to the referenced virtual machine in response to a selection of a snapshot (e.g., the snapshot generated at block 220). That is, in certain scenarios multiple snapshots may be generated/stored (e.g., at different time intervals), such as within a single disk image. Being that multiple snapshots are stored, a user/administrator can provide a selection of which of such snapshots are to be attached to a VM (thereby selecting which of the multiple snapshots operation(s) such as a backup operation is/are to be performed upon).

At block 250, a snapshot (e.g., the snapshot generated at block 220) can be locked. In certain implementations, locking such a snapshot can be caused in view of a determination that a virtual machine (e.g., the virtual machine to which the snapshot can be attached, e.g., at block 240) is performing various operation(s) on the referenced snapshot. For example, in various implementations the referenced operations performed on the snapshot can include a backup operation. Moreover, in various implementations the referenced operations performed on the first snapshot can be performed in a read-only mode. That is, upon attaching the referenced snapshot to another VM, the referenced snapshot can be locked (e.g., by disk image manager 108 and/or hypervisor 107), such as in order to prevent any changes to the snapshot and/or to related parts of the snapshot chain included in the disk image while a backup process (and/or any other such read-only process) is performed upon the snapshot. In doing so, one virtual machine (e.g., the virtual machine to which the snapshot was attached at block 210) can perform (and/or continue to perform) various operations on the snapshot even while another snapshot (or snapshots) contained within the same disk image is locked (e.g., a read-only backup process is being performed on such a snapshot, such as by another VM). Additionally, it should be understood that, in certain implementations the referenced locking can be an exclusive lock (e.g., with respect to a particular operation, VM, etc.) or a shared lock (e.g., a lock that may allow multiple VMs to utilize the locked snapshot).

Figure 3:
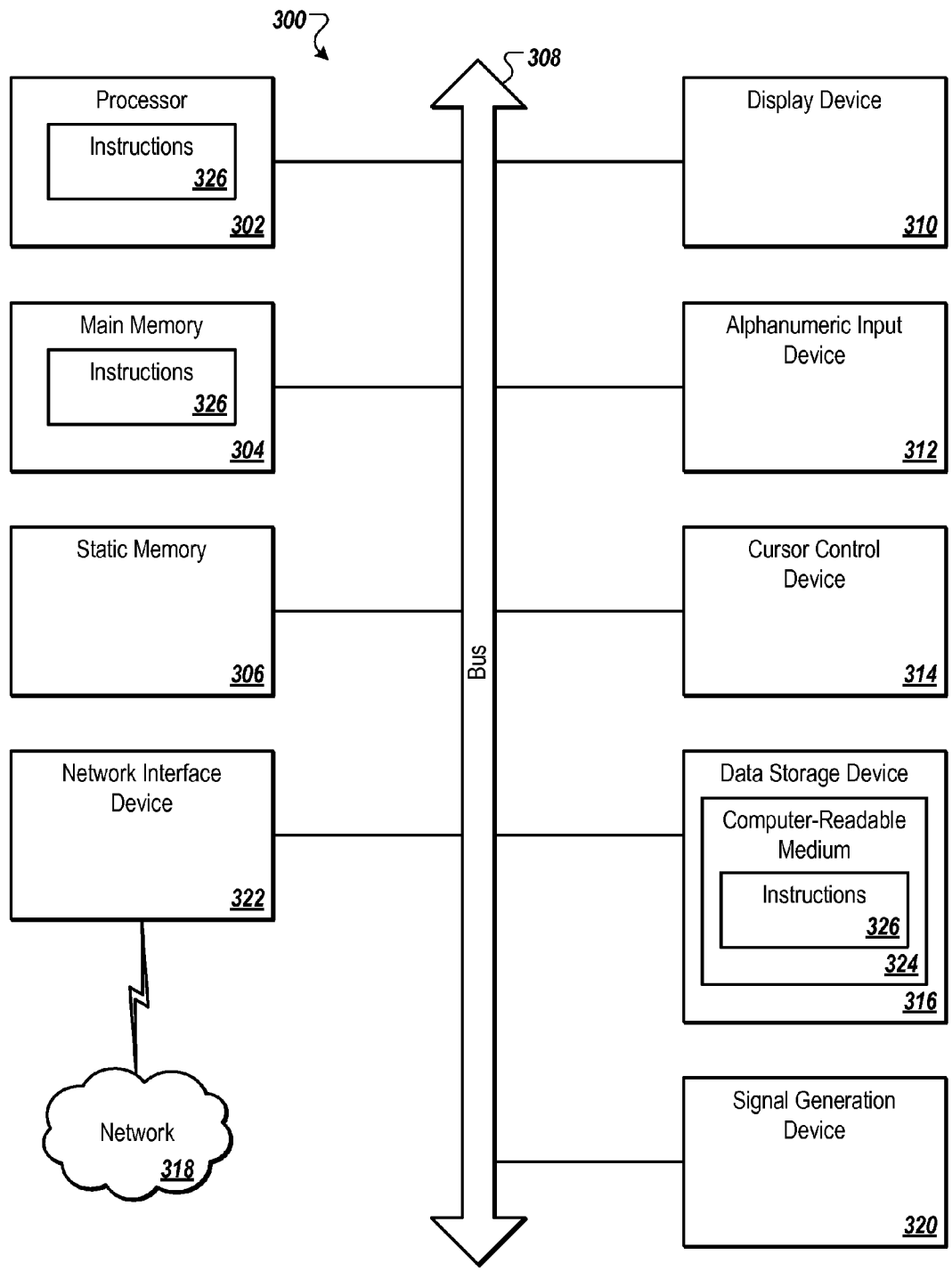
FIG. 3 is a schematic diagram that shows an example of a machine in the form of a computer system.

FIG. 3 is a schematic diagram that shows an example of a machine in the form of a computer system 300. The computer system 300 executes one or more sets of instructions 326 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 326 to perform any one or more of the methodologies discussed herein.

The computer system 300 includes a processor 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 316, which communicate with each other via a bus 308.

The processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions of the host computer system 100 for performing the operations and steps discussed herein.

The computer system 300 may further include a network interface device 322 that provides communication with other machines over a network 318, such as a local area network (LAN), an intranet, an extranet, or the Internet. The computer system 300 also may include a display device 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable storage medium 324 on which is stored the sets of instructions 326 of the host computer system 100 embodying any one or more of the methodologies or functions described herein. The sets of instructions 326 of the host computer system 100 may also reside, completely or at least partially, within the main memory 304 and/or within the processor 302 during execution thereof by the computer system 300, the main memory 304 and the processor 302 also constituting computer-readable storage media. The sets of instructions 326 may further be transmitted or received over the network 318 via the network interface device 322.

While the example of the computer-readable storage medium 324 is shown as a single medium, the term "computer-readable storage medium" can include a single medium or multiple media (e.g., a centralized or distributed database, and/or associated caches and servers) that store the sets of instructions 326. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "attaching", "generating", "locking", "determining", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    attaching a first snapshot to a first virtual machine, the first snapshot being stored within a disk image, wherein the first snapshot is a copy of a virtual disk at a first point in time;
    generating, in view of the first snapshot, a second snapshot while the first snapshot is attached to the first virtual machine, wherein the second snapshot is a copy of the virtual disk at a second point in time;
    attaching the second snapshot to a second virtual machine while the first snapshot is attached to the first virtual machine; and
    causing, by a processing device, the second snapshot to be locked in view of the second virtual machine performing one or more operations on the second snapshot,
    wherein the first virtual machine performs one or more operations on the first snapshot concurrent with the second virtual machine performing one or more operations on the second snapshot while the second snapshot is locked.

2. The method of claim 1, wherein attaching the second snapshot to the second virtual machine comprises attaching the second snapshot to the second virtual machine in response to a selection of the second snapshot.

3. The method of claim 1, wherein the one or more operations performed on the second snapshot comprise a backup operation.

4. The method of claim 1, wherein the one or more operations performed on the second snapshot are performed in a read-only mode.

5. The method of claim 1, wherein the attaching the second snapshot to the second virtual machine comprises attaching the second snapshot to the second virtual machine in response to an efficiency metric reflecting that the second virtual machine performing one or more operations on the second snapshot is more efficient than performing the one or more operations on the disk image.

6. The method of claim 1, wherein the first snapshot and the second snapshot are stored as a chain of linked snapshots with the disk image.

7. A system comprising:
a memory; and
a processing device, operatively coupled to the memory, to:
attach a first snapshot to a first virtual machine, the first snapshot being stored within a disk image, wherein the first snapshot is a copy of a virtual disk at a first point in time;
generate, in view of the first snapshot, a second snapshot while the first snapshot is attached to the first virtual machine, wherein the second snapshot is a copy of the virtual disk at a second point in time;
attach the second snapshot to a second virtual machine while the first snapshot is attached to the first virtual machine; and
cause the second snapshot to be locked in view of a performance by the second virtual machine of one or more operations on the second snapshot,
wherein the first virtual machine is to perform one or more operations on the second snapshot concurrent with the second virtual machine performing one or more operations on the second snapshot while the second snapshot is locked.

8. The system of claim 7, wherein to attach the second snapshot to the second virtual machine is to attach the second snapshot to the second virtual machine in response to a selection of the second snapshot.

9. The system of claim 7, wherein the one or more operations performed on the second snapshot comprise a backup operation.

10. The system of claim 7, wherein the one or more operations performed on the second snapshot are performed in a read-only mode.

11. The system of claim 7, wherein the processing device is to attach the second snapshot to the second virtual machine in response to an efficiency metric reflecting that the second virtual machine performing one or more operations on the second snapshot is more efficient than performing the one or more operations on the disk image.

12. The system of claim 7, wherein the first snapshot and the second snapshot are stored as a chain of linked snapshots with the disk image.

13. A non-transitory computer-readable storage medium having instructions that, when executed by a processing device, cause the processing device to:
attach a first snapshot to a first virtual machine, the first snapshot being stored within a disk image, wherein the first snapshot is a copy of a virtual disk at a first point in time;
generate, in view of the first snapshot, a second snapshot while the first snapshot is attached to the first virtual machine, wherein the second snapshot is a copy of the virtual disk at a second point in time;
attach the second snapshot to a second virtual machine while the first snapshot is attached to the first virtual machine; and
cause, by the processing device, the second snapshot to be locked in view of the second virtual machine performing one or more operations on the second snapshot,
wherein the first virtual machine performs one or more operations on the first snapshot concurrent with the second virtual machine performing one or more operations on the second snapshot while the second snapshot is locked.

14. The non-transitory computer-readable storage medium of claim 13, wherein to attach the second snapshot to the second virtual machine the processing device is further to attach the first snapshot to the second virtual machine in response to a selection of the first snapshot.

15. The non-transitory computer-readable storage medium of claim 13, wherein the one or more operations performed on the first snapshot comprise a backup operation.

16. The non-transitory computer-readable storage medium of claim 13, wherein the one or more operations performed on the first snapshot are performed in a read-only mode.

17. The non-transitory computer-readable storage medium of claim 13, wherein to attach the second snapshot to the second virtual machine the processing device is further to attach the second snapshot to the second virtual machine in response to an efficiency metric reflecting that the second virtual machine performing one or more operations on the second snapshot is more efficient than performing the one or more operations on the disk image.

18. The non-transitory computer-readable storage medium of claim 13, wherein the first snapshot and the second snapshot are stored as a chain of linked snapshots with the disk image.

* * * * *